W. H. LEARMONT.
VEHICLE SIGNAL.
APPLICATION FILED DEC. 5, 1918.
1,398,641. Patented Nov. 29, 1921.
5 SHEETS—SHEET 1.
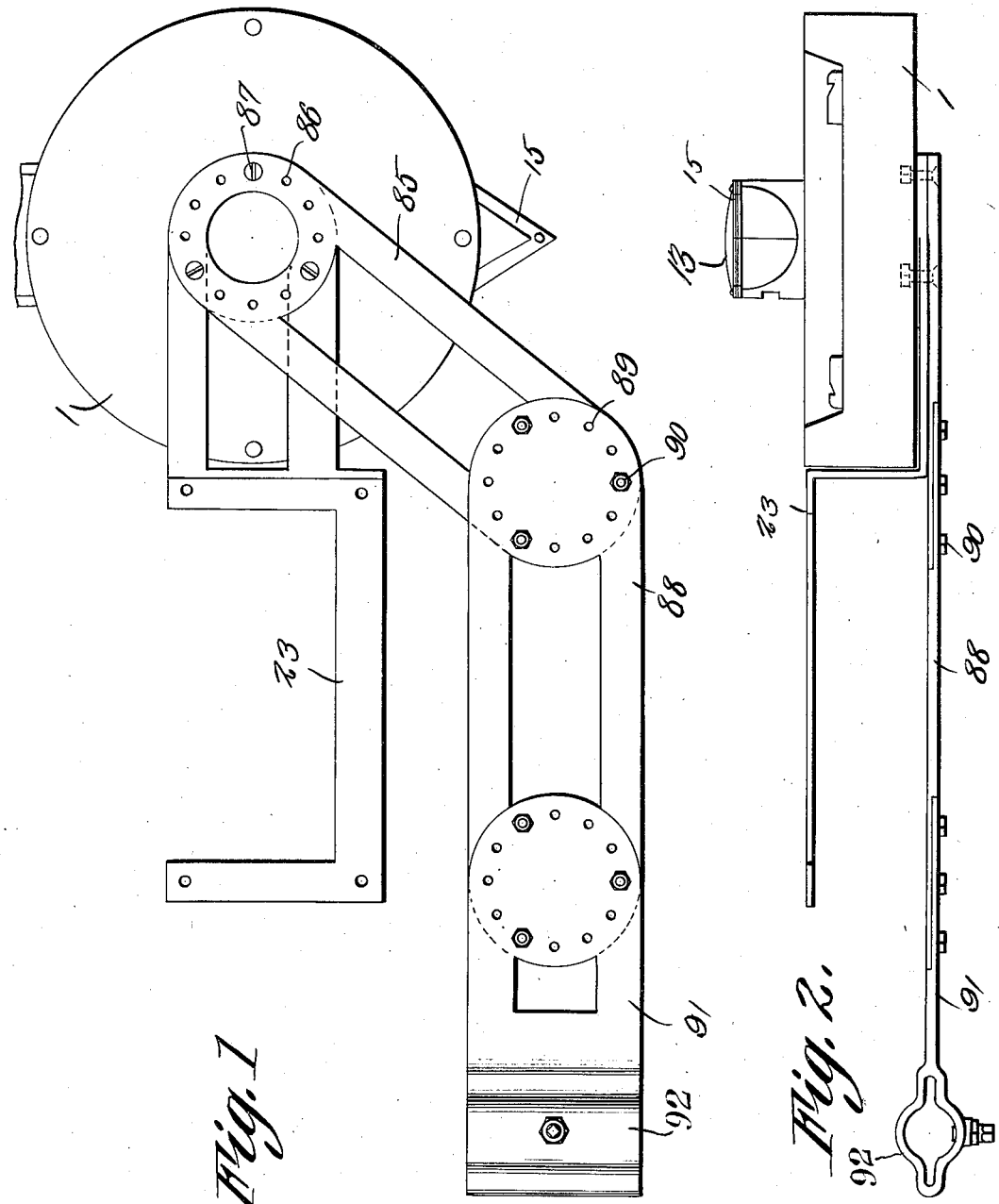
Inventor,
W. H. Learmont
By C. A. Snow & Co.
Attorneys,
Witness

W. H. LEARMONT.
VEHICLE SIGNAL.
APPLICATION FILED DEC. 5, 1918.

1,398,641.

Patented Nov. 29, 1921.
5 SHEETS—SHEET 2.

Witness

Inventor
W. H. Learmont
By C. A. Snow & Co.
Attorneys

W. H. LEARMONT.
VEHICLE SIGNAL.
APPLICATION FILED DEC. 5, 1918.
1,398,641. Patented Nov. 29, 1921.
5 SHEETS—SHEET 3.
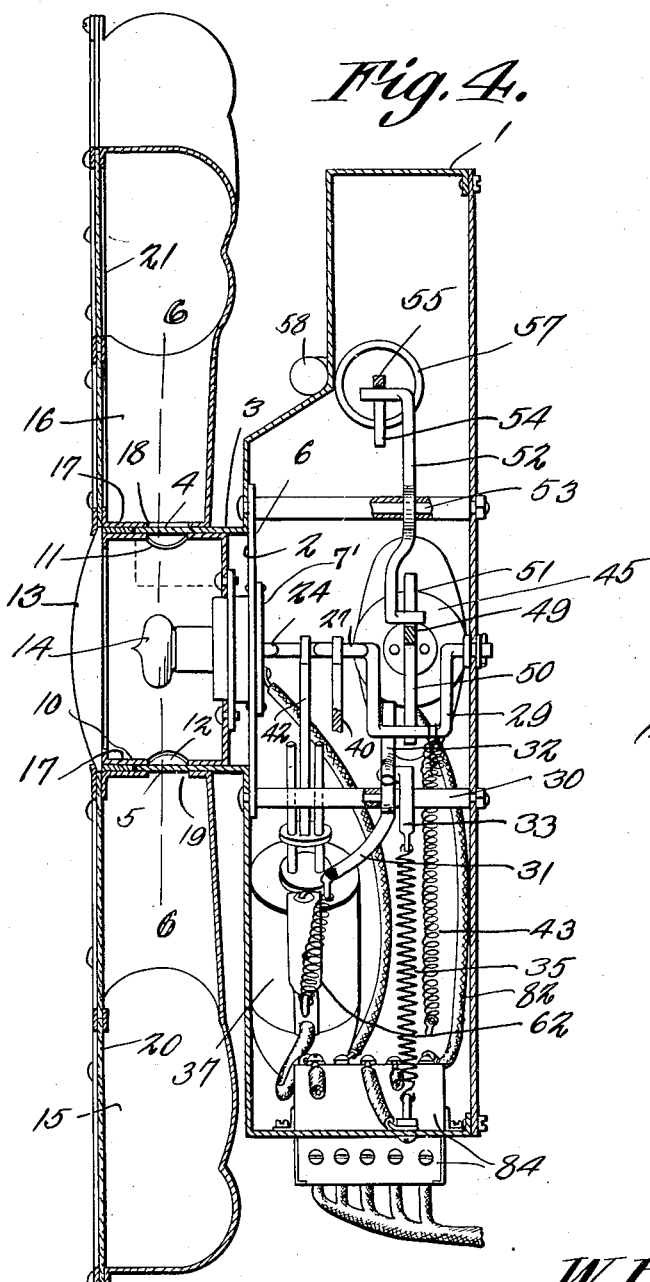
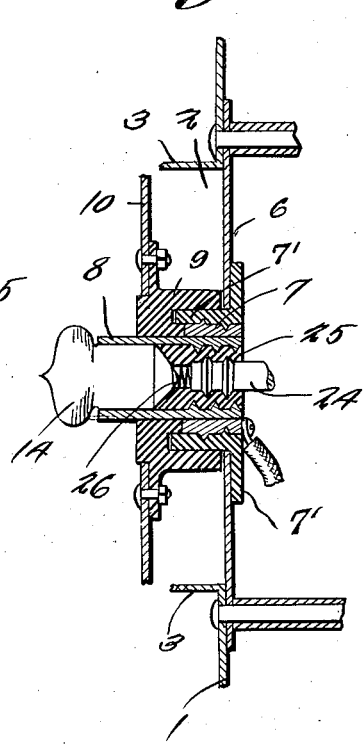
W. H. Learmont
Inventor,
Witness
By C. A. Snow & Co.
Attorneys.

W. H. LEARMONT.
VEHICLE SIGNAL.
APPLICATION FILED DEC. 5, 1918.

1,398,641.

Patented Nov. 29, 1921.
5 SHEETS—SHEET 4.

Inventor,
W. H. Learmont
By C. A. Snow & Co.
Attorney

Witness

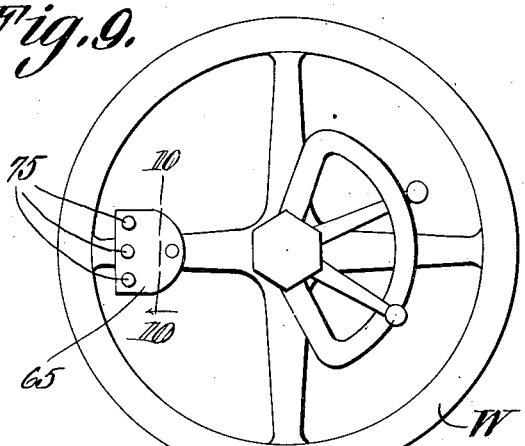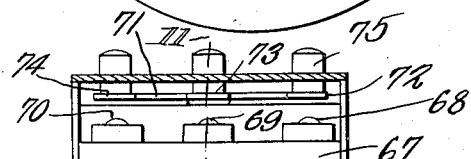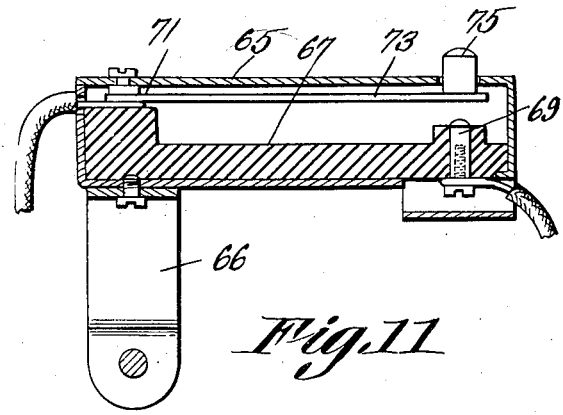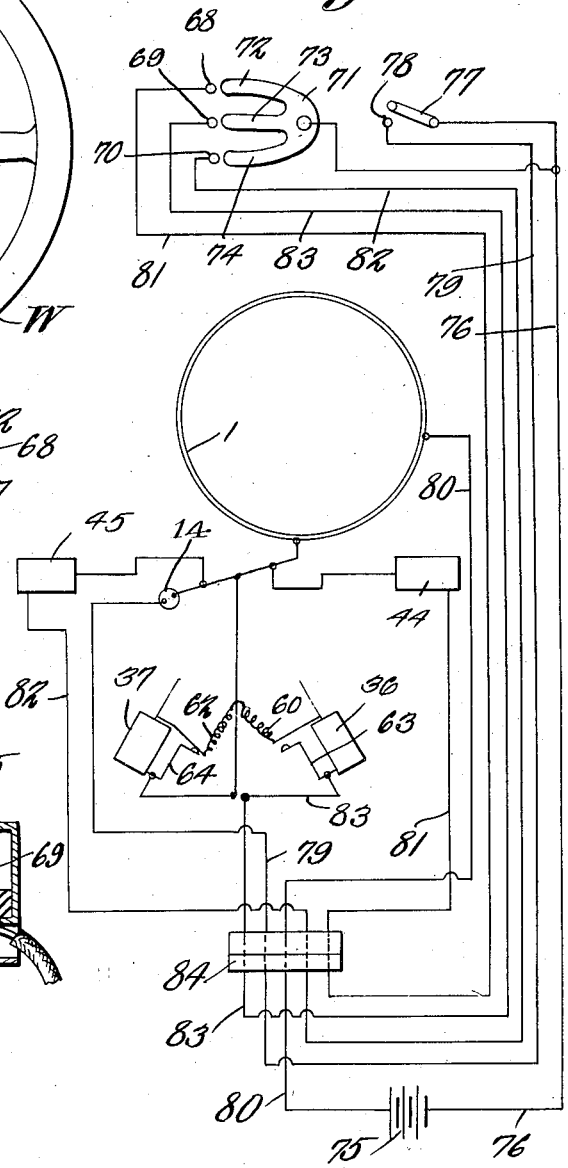

UNITED STATES PATENT OFFICE.

WILLIAM H. LEARMONT, OF YALE, MICHIGAN.

VEHICLE-SIGNAL.

1,398,641.   Specification of Letters Patent.   Patented Nov. 29, 1921.

Application filed December 5, 1918. Serial No. 265,423.

*To all whom it may concern:*

Be it known that I, WILLIAM H. LEARMONT, a citizen of the United States, residing at Yale, in the county of St. Clair and State of Michigan, have invented a new and useful Vehicle-Signal, of which the following is a specification.

This invention relates to a signal for vehicles, one of its objects being to provide a combined tail lamp and direction indicator which is electrically operated and is under constant control of the driver who, by pressing one of a set of buttons, can cause the signal to point either to the right or to the left or can cause it to oscillate, the latter action being utilized to indicate that the vehicle is going to stop.

Another object is to provide a signal which can be applied readily to a vehicle and will not detract from the appearance thereof.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is an elevation of the signal and its supporting bracket.

Fig. 2 is a plan view.

Fig. 4 is a central vertical section through said casing and indicator.

Fig. 5 is an enlarged section through the lamp socket and adjacent parts.

Fig. 9 is a plan view of control buttons applied to the steering wheel of a vehicle.

Fig. 10 is an enlarged section on line 10—10, Fig. 9, the wheel being removed.

Fig. 11 is a section on line 11—11, Fig. 10.

Fig. 12 is a view showing, in diagram, the wiring of the apparatus.

Figure 3:
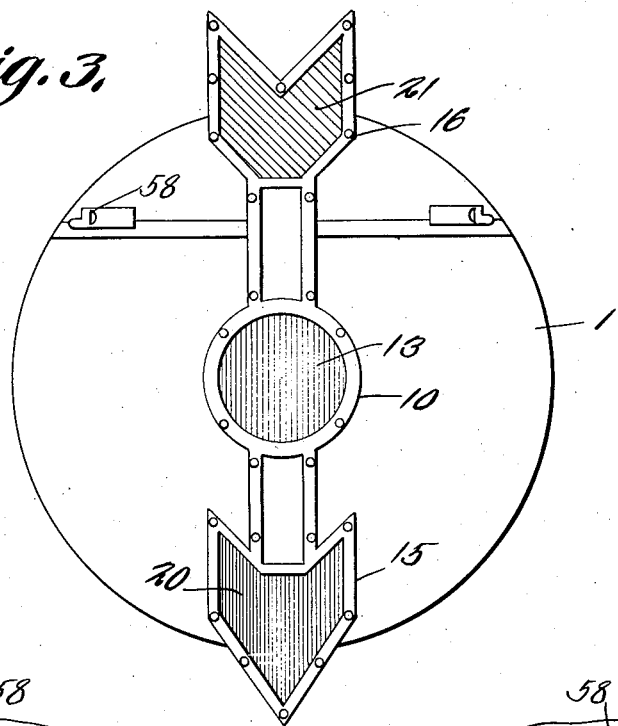
Fig. 3 is a view of the casing and indicator of the signal as they appear when viewed from a point back of the vehicle, the attaching bracket being removed.
Figure 6:
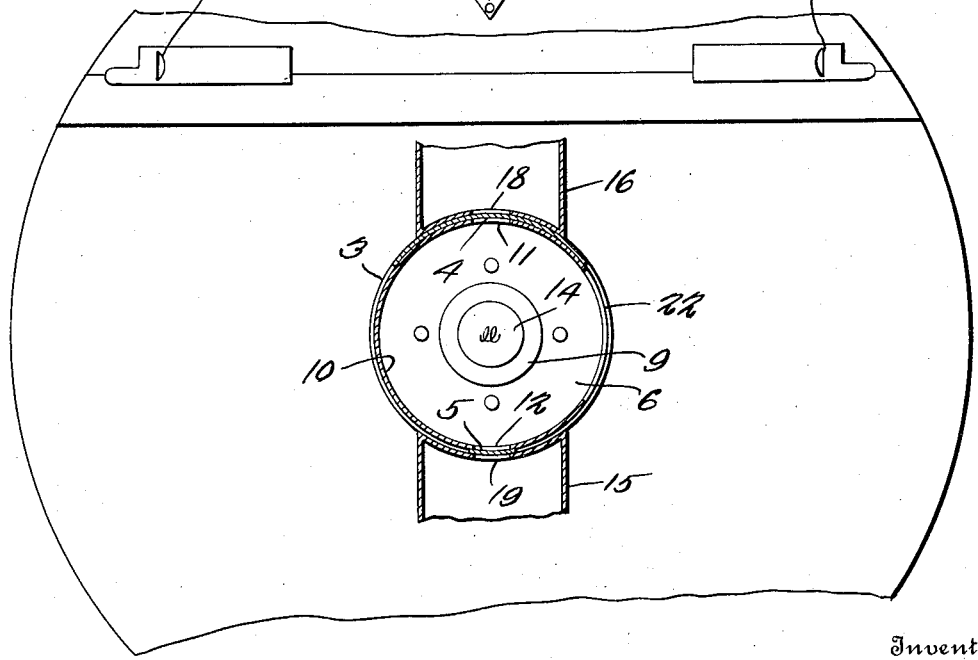
Fig. 6 is a section on line 6—6, Fig. 4.
Figures 7, 8:
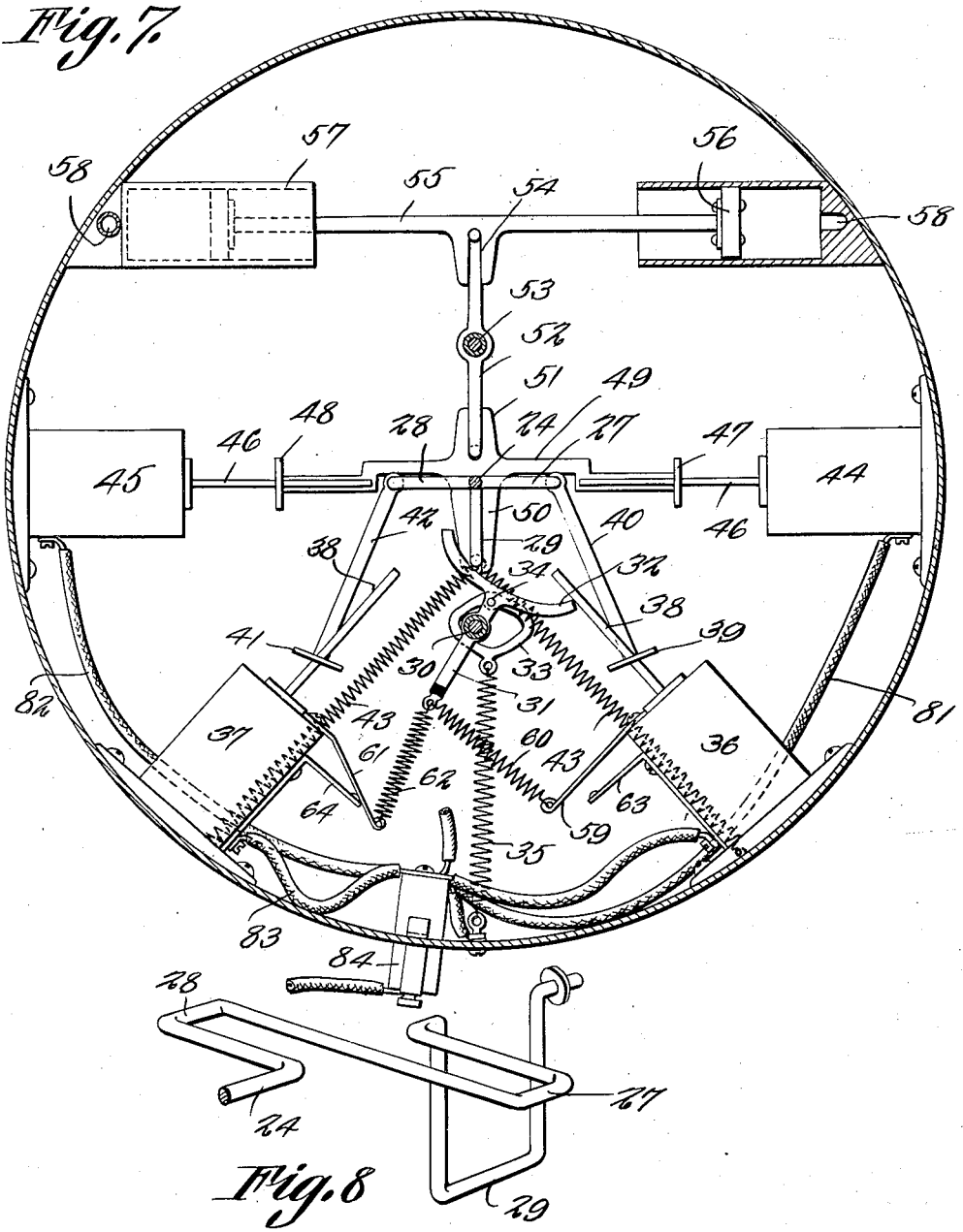
Fig. 7 is a vertical transverse section through the casing of the signal and showing the interior mechanism partly in section and partly in elevation.
Fig. 8 is a perspective view of the indicator shaft.

Referring to the figures by characters of reference, 1 designates a cylindrical casing provided in one face with an opening 2 surrounded by an outwardly extending tubular bearing member 3 from which projects a broad arcuate shutter 4 located at the top thereof, while a narrow shutter 5 projects from the lower portion of said member 3.

A plate 6 is secured across the opening 2 and is provided with a bearing 7 in which is journaled a socket member 8. A ring 9 of insulation is secured around and moves with the socket member and has secured to it a circular lamp housing 10 provided with diametrically opposed openings 11 and 12 which are normally closed by the shutters 4 and 5 respectively. The front of the housing 10 is closed with a lens 13 preferably of red glass and a lamp 14 is seated in the socket member 8 directly back of this lens, the sleeve terminal of the lamp being electrically connected, through the socket member 8 with bearing 7 but insulated at 7' from casing 1.

Extending in opposite directions from the housing 10 is a hollow head member and a hollow tail member, shown at 15 and 16 respectively, these members being spaced from the housing 10 by a ring 17 which also constitutes a connection between the parts and allows the shutters 4 and 5 to project between the housing and the members 15 and 16. Openings 18 and 19 are formed in those ends of the tail and head members nearest the housing 10 and register with the openings 11 and 12 respectively, although when the parts are in their normal positions with the members 15 and 16 vertical, the shutters 4 and 5 close communication between the openings 11 and 18, and 12 and 19. The head member 15 is preferably shaped like the head of an arrow, the front face thereof being formed of red glass, as shown at 20 while the member 16 is preferably shaped like the tail of an arrow, the front face 21 thereof being formed of green glass. The interior faces of the members 15 and 16 are mirrored so that light rays directed into the members will be reflected through the glass faces of the members. That portion of the housing 10 at one side of the indicator is provided with a slot 22 so that when the indicator is in normal or vertical position, light rays can escape laterally from the housing so as to illuminate a license tag which may be supported by a bracket 23 provided therefor and which extends laterally from the back of the casing 1, this bracket being extended forwardly a sufficient distance to support the tag substantially flush with the front face of the casing 1, as shown in Fig. 2.

Journaled within the casing 1 is a shaft 24 one end of which extends into and rotates with the socket member 8 but is separated therefrom by insulation, as shown at 25. A spring 26 constitutes a connection between the shaft and the end contact of the lamp. This shaft is provided with two oppositely extending cranks 27 and 28 and a downwardly extending crank 29 disposed at 90° thereto. A pivot pin 30 is located directly under the shaft 24 and an arm 31 is mounted to swing thereon, there being a yoke at the upper end of the arm, as shown at 32, the terminals of which are adapted successively to project into the path of the depending crank 29. A link 33 extends loosely around the pin 30 and is pivotally connected, as at 34, to the upper end of the arm 31. The lower end of the link is connected to a spring 35 which extends downwardly and is secured to the lower portion of the casing 1. It will be obvious that the spring 35 will hold the arm tilted either to the right or to the left and when in either of these positions, one of the terminals of the yoke 32 projects into the path of the crank 29.

Arranged radially within the casing 1 at opposite sides of the spring 35 are electromagnets 36 and 37 each of which has a radially disposed guide pin extending inwardly therefrom, as shown at 38. An armature 39 is slidably mounted on one of these pins and is connected by an arm 40 to the crank 27. Another armature 41 is mounted on the other pin 38 and is connected by an arm 42 to the crank 28. For the purpose of holding the crank 29 normally in a downwardly extending position, springs 43 diverge downwardly therefrom and are connected to the lower portion of the casing 1.

Oppositely disposed magnets 44 and 45 are secured to the casing in horizontal alinement with the axis of the shaft 24 and each has a guide pin 46 extending inwardly therefrom. Armatures 47 and 48 are slidably mounted on the respective pins and are connected by a cross-head 49 having a downwardly extending forked arm 50 which straddles and engages the crank 29. Another forked arm 51 is extended upwardly from the cross-head and engages one end of a lever 52 fulcrumed on a pin 53 secured in the casing 1 directly over the shaft 24. The upper end of this lever projects into a slot 54 arranged vertically within a connecting strip 55 the ends of which are secured to pistons 56 slidable in cylinders 57. These cylinders are oppositely disposed within and secured to the casing 1 and each has an outlet 58 forming a whistle.

Connected to one pole of the magnet 36 is a spring strip 59 connected by a spring 60 to the insulated lower end of the arm 31. Another spring strip 61 is connected to one pole of the magnet 37 and a spring 62 connects this strip 61 to the lower end of arm 31 and to spring 60. To the other pole of magnet 36 is connected a bracket of conductive material as shown at 63 and which extends under and into the path of the strip 59. A similar bracket 64 is connected to the corresponding pole of the magnet 37 and extends below and into the path of the strip 61.

For the purpose of controlling the operation of the signal a housing 65 may be connected to the steering wheel W of the motor vehicle by means of a clip 66. A block 67 of insulating material is located in the housing 65 and has separate contacts therein, as shown at 68, 69 and 70. A plate 71 of conductive material is secured to the block 67 and has separate spring fingers 72, 73 and 74 adapted to be operated by push buttons 75 or the like.

A battery 75 or other source of electrical energy is electrically connected by a conductor 76 to the plate 71 and also to one member 77 of a switch, the other member 78 of said switch being electrically connected by a conductor 79 to the socket 8 of the lamp 14. A conductor 80 connects the casing 1 to the battery 75 and, therefore, when the switch members 77 and 78 are in contact, a circuit is established through the lamp by way of the shaft 24, casing 1 and spring 26. As long as the lamp is in circuit the housing 10 will be illuminated and a red light will be directed from the rear of the housing through lens 13, while a white light will be directed laterally upon the supported tag.

When the index is to be turned to indicate that the vehicle is to turn to the right the driver depresses the finger 72 against the contact 68. This closes the circuit through the conductor 76 and a conductor 81 which leads to one terminal of the magnet 44. The other pole of the magnet is electrically connected to the casing 1 and, therefore, the magnet is energized by this closing of the circuit. The magnet 44 draws its armature 47 and causes the arm 50 to rotate the shaft 24 and swing the index through 90°. The openings 11, 12, 18 and 19 are thus moved away from their shutters and the light from the lamp passes into the portions 15 and 16 so as to illuminate them. By depressing the strip 74 a circuit is established through the conductor 79 and a conductor 82 with the result that magnet 45 is energized and the index turned to indicate that the vehicle is to turn to the left.

A conductor 83 connects the contact 69 with the bracket 63 of magnet 36 and the bracket 64 is electrically connected to the casing 1. Thus, when it is desired to oscillate the index to indicate that the vehicle is to stop, the strip 73 is depressed against the contact 69 which closes the circuit through the magnet 36, springs 60 and 62, contacting members 61 and 64, casing 1 and conductor 80. As soon as magnet 36 is thus energized it attracts its armature 39 which pulls on crank 27 and thrusts crank 29 against the elevated end of the yoke 32. Said yoke is thus shifted past its dead center to its other position so that spring 62 thus pulls strip 61 out of contact with bracket 64 while spring 59 is released and engages bracket 63. The current therefore shunts around the magnet 36 which is thereby deënergized while magnet 37 is energized. Consequently armature 41 is drawn toward its magnet and the shaft 24 is rotated in the other direction. The oscillation of the index is thus set up and each time the index is swung laterally out of its normal or vertical position the apertures 12 and 19 move away from the shutter 5 so that flashes of light will appear in the swinging lower end or head of the index. As soon as the contact between the strip 73 and terminal 69 is broken the oscillation of the index stops. Whenever the shaft is actuated to shift the index or to oscillate it, motion is transmitted therefrom through the cross-head 55 to the pistons 56 and the whistles are sounded, thereby attracting attention to the index. To facilitate the wiring of the apparatus a junction box 84 is preferably secured in the wall of the casing 1, as shown. It is to be understood that various modifications of the wiring of the apparatus can be used within the scope of the present invention.

For the purpose of connecting the signal to a vehicle an adjustable bracket can be provided. As shown in Figs. 1 and 2 this bracket may include a strip 85 having a circular series of apertures 86 certain ones of which are engaged by fastening screws 87, extending from the casing 1. Another strip 88 having a circular series of apertures 89 may be fastened by screws 90 to the strip 85, while a strip 91, having a clip 92 at one end, may be similarly connected to the strip 88 by the use of a circular series of apertures 92 and screws 93 or the like. By connecting the parts of the bracket in the manner described, said bracket can be adjusted angularly at the different joints.

What is claimed is:—

1. In a vehicle signal the combination with a normally stationary index having translucent faces, and a lamp housing between the ends of the index and at the axis of movement thereof, of a lamp for illuminating said housing, stationary shutters normally cutting off light rays from the housing to the translucent faces of the index, a switch adapted to be operated by the driver, an electrically operated means controlled by one movement of the switch for continuously oscillating the index relative to the shutters to intermittently illuminate said faces of the index while the switch is held at the position to which it is moved by the driver.

2. A vehicle signal including a normally stationary index having translucent faces, a lamp housing between the ends of the index and at the axis of movement thereof, a lens closing one end of the housing, a lamp within the housing for illuminating the lens, separate switches under control of the driver of the vehicle, electrically operated means controlled by one of the switches for rotating the index to point in one direction and illuminate the faces of the index, electrically operated means under the control of a second switch for rotating the index in the opposite direction and illuminating the faces thereof, and electrically operated means under the control of the other switch for oscillating the index and intermittently illuminating the faces while said switch is held in shifted position.

3. In a vehicle signal the combination with an index having translucent faces, and a lamp housing between the ends of the index and at the axis thereof, a lens closing one end of the housing, and a lamp within the housing, of a switch, a crank shaft revoluble with the index, a yoke mounted for oscillation and having its ends movable successively to position in the path of one of the cranks of the shaft, yieldingly held means for holding one of the ends of the yoke normally projected into the path of said crank, electro magnets, means under the control of the operator for energizing one of the magnets to rotate the crank shaft in one direction and press one of the cranks against the yoke to shift said yoke from one extreme position to another, a second electromagnet, means operated by the shifting of the yoke for deënergizing the first named magnet and directing electric current to the said magnet, and means operated by said second magnet for rotating the crank shaft in the opposite direction to return the yoke to its initial position and deënergize the second magnet and reënergize the first named magnet, thereby to oscillate the index.

4. In a vehicle signal the combination with an index mounted for oscillation, and a shaft revoluble with the index and having a plurality of cranks, of armatures connected to oppositely extending cranks of the shaft, electromagnets adjacent the respective armatures, a yoke mounted for oscillation, yielding means for holding the yoke at either of its extreme limits of movement and with one of its ends in the path of one of the cranks, a switch, means controlled by the actuation of the switch for energizing one of the magnets to attract its armature, rotate the crank shaft, and tilt the yoke to its other extreme position, and means operated by the tilting of the yoke for deënergizing one magnet and closing the circuit to the other magnet, thereby to reverse the movement of the crank shaft and restore the yoke to its first extreme position, thereby to oscillate the index.

In testimony that I claim the foregoing as my own, I have hereto affixed my signature in the presence of two witnesses.

WILLIAM H. LEARMONT.

Witnesses:
NORMAN B. HERBERT,
JEAN HERBERT.